Oct. 31, 1967
R. REE
3,349,733
THREAD HOLDING AND RELEASING SYSTEM IN CHANGE-COLOR EMBROIDERY MACHINES
Filed June 30, 1965
5 Sheets-Sheet 1
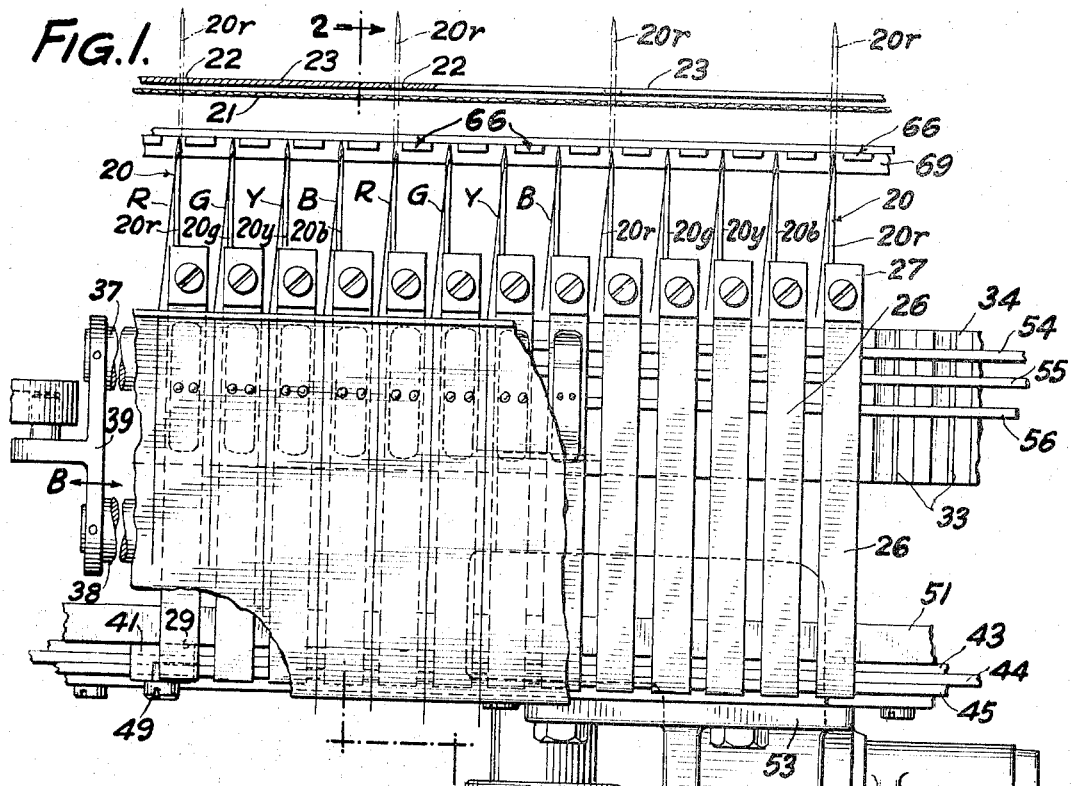
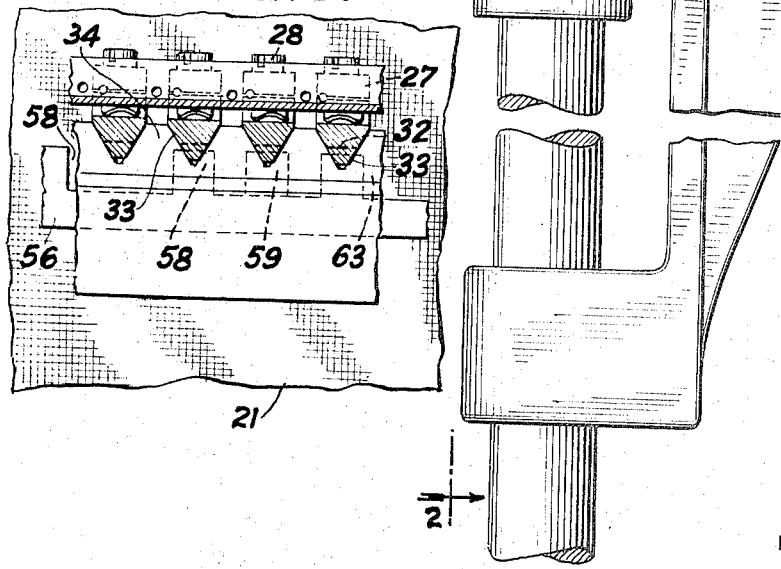
INVENTOR
ROELOF REE
BY
ATTORNEY

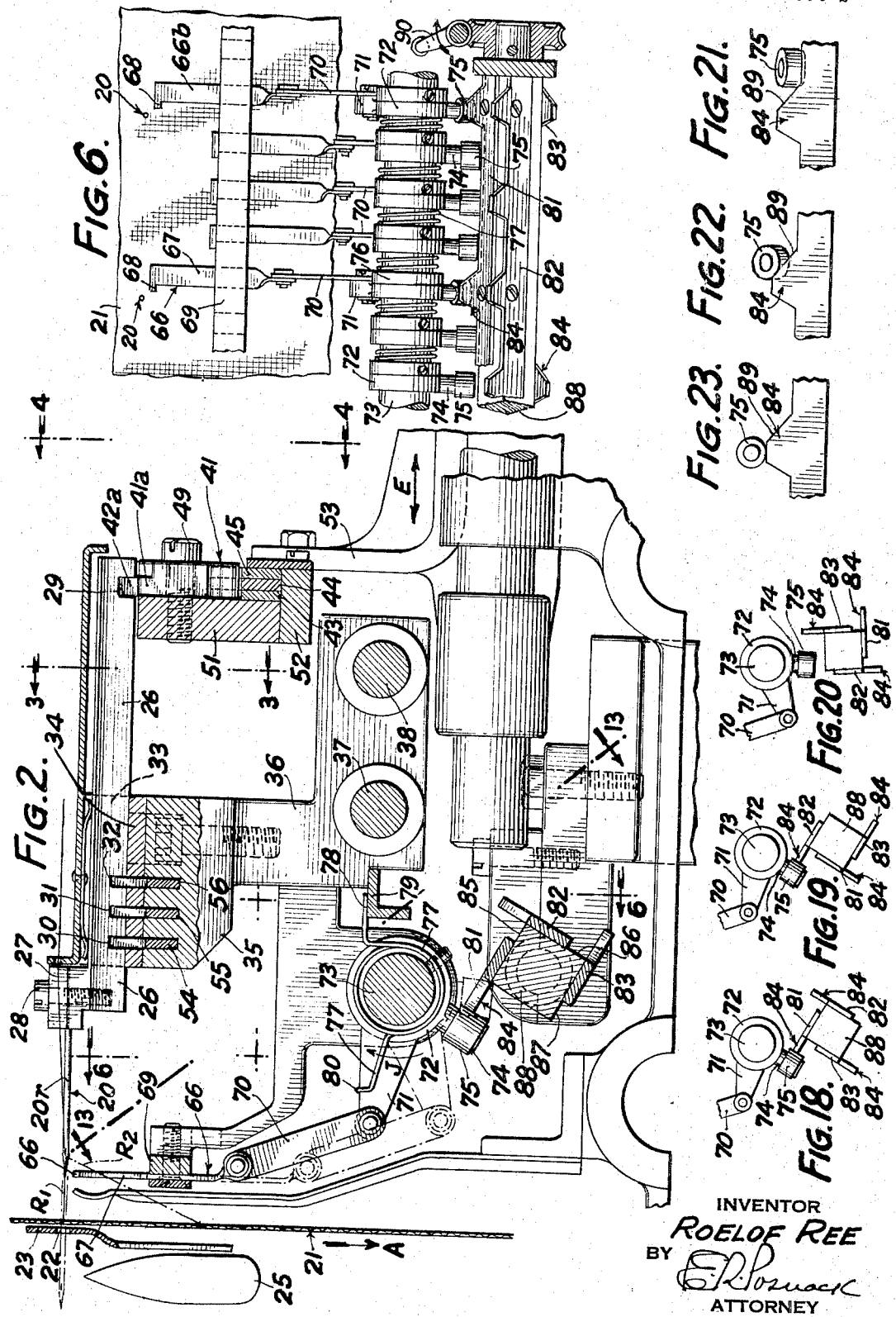

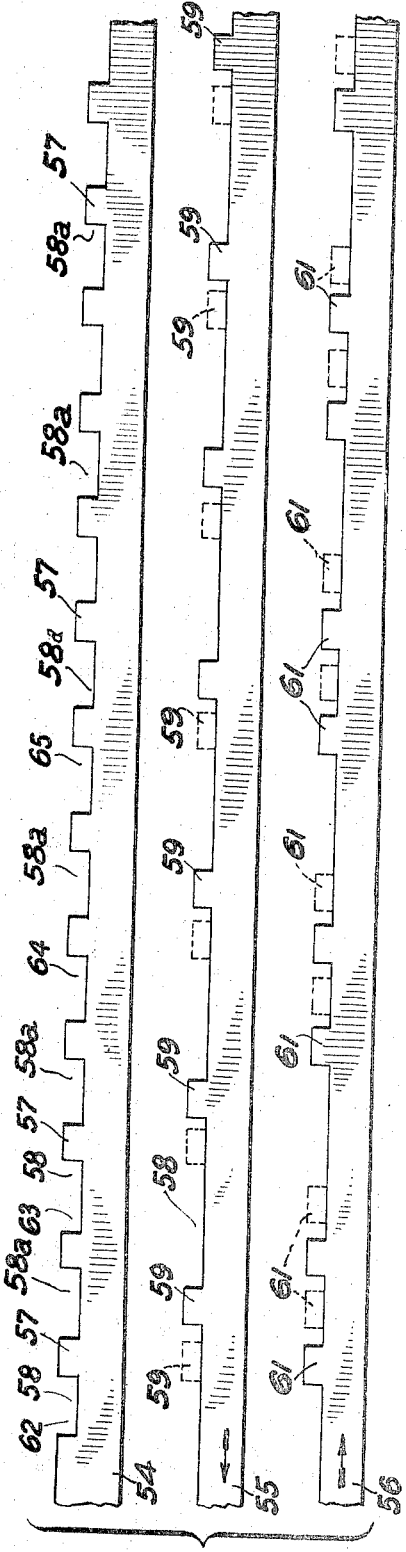
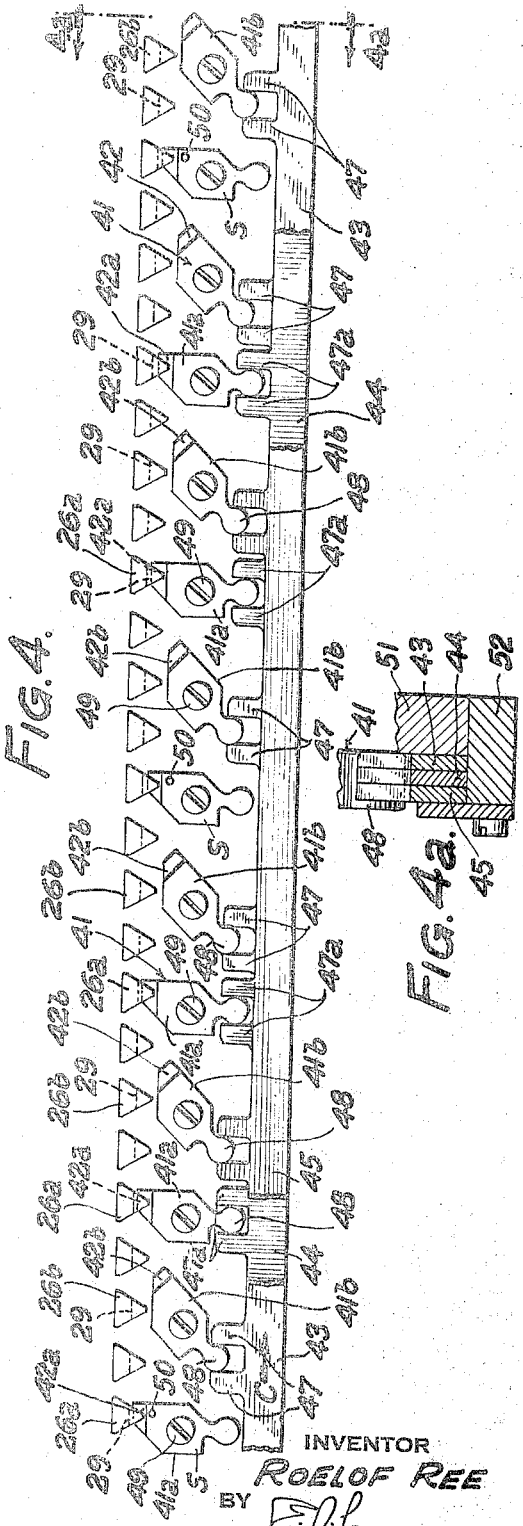

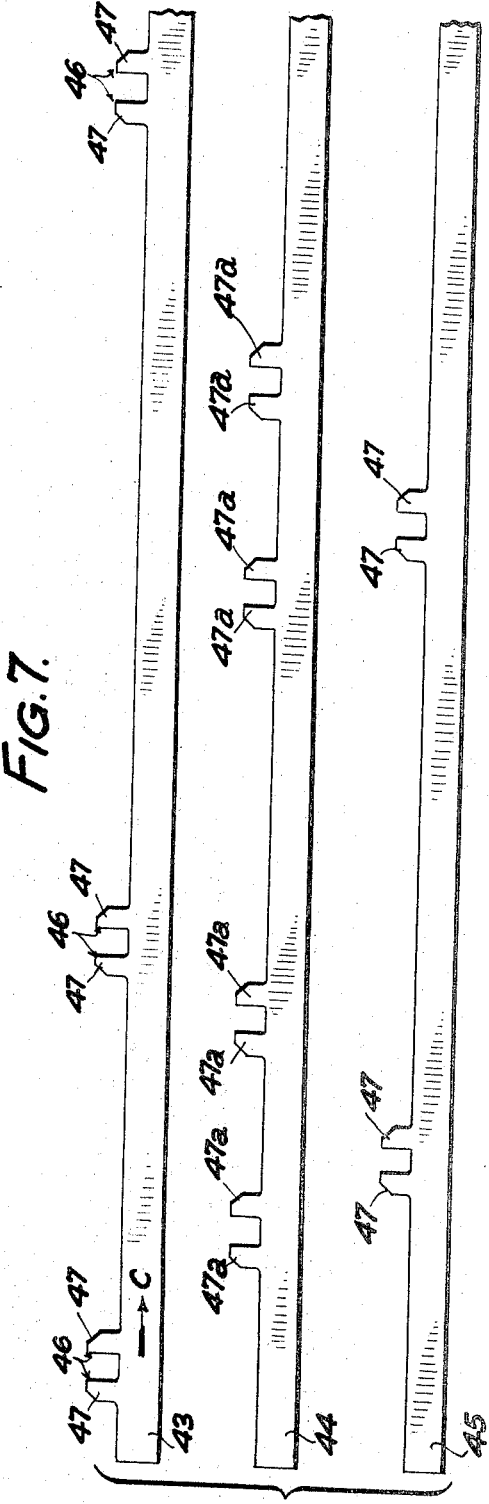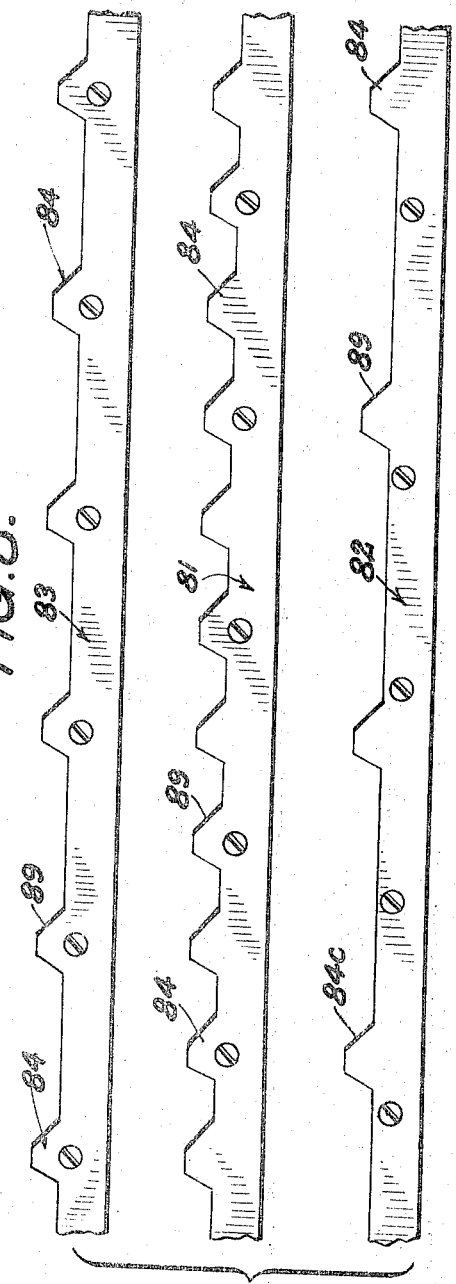

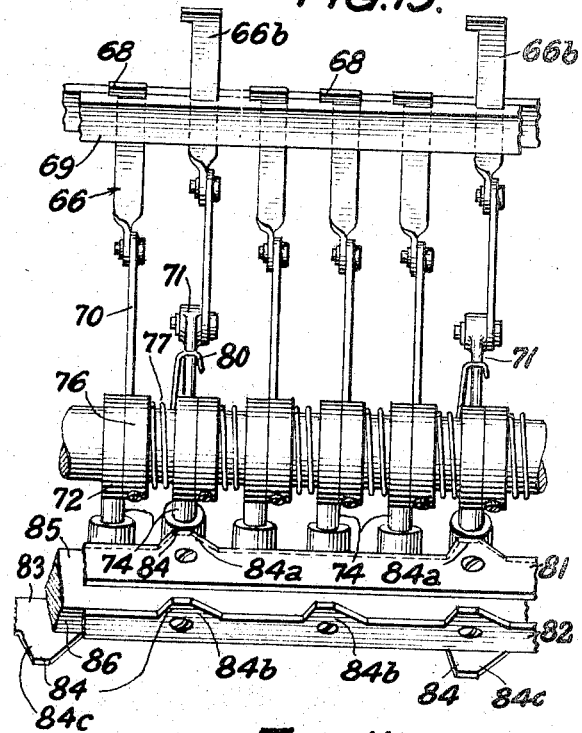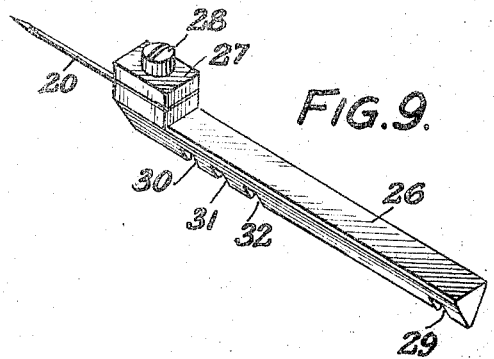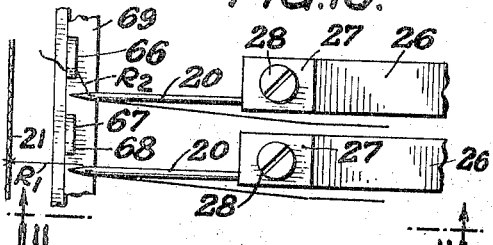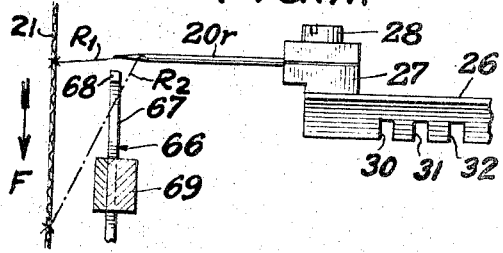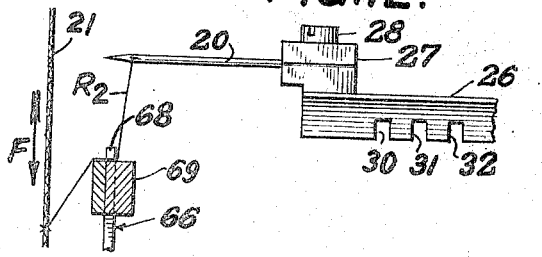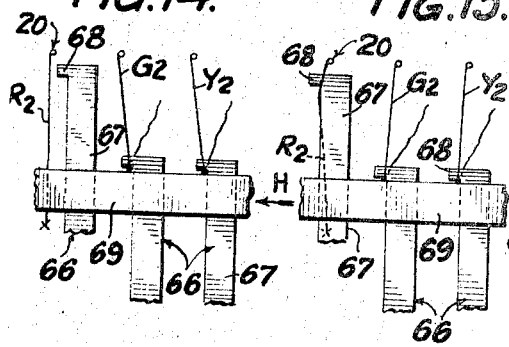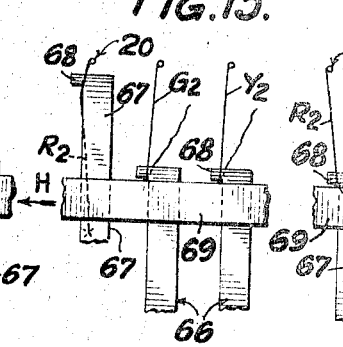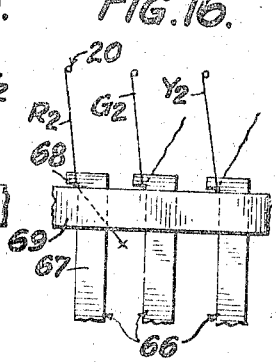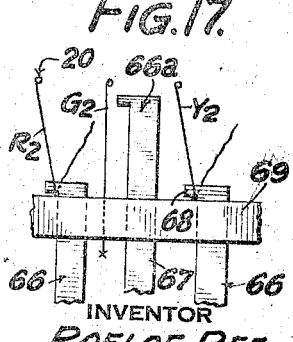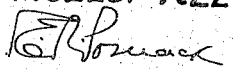

United States Patent Office 3,349,733
Patented Oct. 31, 1967

3,349,733
THREAD HOLDING AND RELEASING SYSTEM IN CHANGE-COLOR EMBROIDERY MACHINES
Roelof Ree, East Paterson, N.J., assignor to I.A.S. Bicor Corporation, West New York, N.J., a corporation of New Jersey
Filed June 30, 1965, Ser. No. 468,298
2 Claims. (Cl. 112—83)

ABSTRACT OF THE DISCLOSURE

Selective thread holding and releasing means for Schiffli and other types of embroidery machines having reciprocating needles carrying threads of selected colors and provided with change-color means. The holding apparatus of this invention is provided with means to hold fabric-connected thread sections of selected colors, to selectively release sets of non-operating thread for ensuing operations, and to hold attached thread sections in position for convenient severing.

---

This invention relates to change-color apparatus in embroidery machines, and is especially directed to selective thread holding and releasing means in such apparatus.

In embroidery machines, such as those of the Schiffli category, one method of changing color work is to employ a plurality of sets of needles, each set carrying a different color or type of thread and each needle being supported by a needle finger, the fingers being slidably supported by a bed which is shiftable into various positions for bringing the needles of the respective sets into operative embroidering positions. Such an appartus is described in a pending application, Ser. No. 295,700 which matured on Apr. 13, 1965, into Patent No. 3,177,834. In accordance with the operating characteristics of such machines, the needles of a set which has just completed a predetermined operation are still connected to the fabric by thread sections; and these sections must be severed before another color set of needles can be brought into operation. Such severed thread sections, if permitted to dangle, would seriously impede the efficacy of the embroidering operations, causing tangling of threads especially on close repeat patterns, and the pulling of threads out of needle eyes by the action of the "Fadenleiter" (thread control) bars. To meet these problems it was deemed necessary separately to pull the threads out of the non-operative needles and manually lay each of such threads back—a difficult and time-consuming job worsened by the need for subsequent re-threading operations and the danger of soiling the threads by manual handling.

It is the general objective of this invention to enable a multi-color embroidery machine of the above class to be efficiently operated without any of the above-mentioned time-consuming, costly and thread-soiling operations. Among its specific objects are the provision of means for positioning and holding fabric-connected thread sections and for selectively releasing sets of held non-operating threads for ensuing embroidery operations. And in this aspect of my invention it is an object to hold the attached thread sections in position for convenient severing, and also to hold the severed threads away from moving machine parts and maintain them in positions ready for subsequent embroidering use.

It is a further object to effect a coactive relationship between the various positions of said shiftable bed and the selected positions of said thread holding and releasing means.

Another object of my invention is to enable said thread holding and releasing means to be selectively adjustable for various multi-color set-ups, such as for selected two-color, four-color, six-color and other needle-set arrangements.

And it is within my contemplation to provide a relatively simple and easily operated apparatus for accomplishing the above-stated objects of my invention.

Other objects, features and advantages will appear from the drawings and the description hereinafter given.

Referring to the drawings,

FIG. 1 is a fragmentary plan view of an embroidery machine embodying the selective needle actuating and thread-holding and releasing means of this invention, parts being broken away for clarity, the dot-dash lines showing the needles in their operatively projected positions.

FIG. 2 is a fragmentary section of FIG. 1 taken substantially along line 2—2 thereof, the dot-dash lines showing a holding member and associated parts in an operatively lowered position, and a needle in an operatively projected position.

FIG. 3 is a fragmentary section of FIG. 2 taken along line 3—3.

FIG. 4 is a fragmentary longitudinal elevation of a portion of the embroidery machine, shown looking in the direction of arrows 4—4 of FIGURE 2, illustrating the relative positions of needle fingers, driving members and three driving combs, one set of driving members being shown in operative engagement with one of the driving combs, fragments of said combs being broken away and portions of the machine being omitted for clarity.

FIG. 4a is an enlarged section of FIG. 4 taken along line 4a—4a.

FIG. 5 is a disassembled arrangement, in elevation, of the three locking combs of this invention, said combs being shown in mutual operative relation, the dotted line representing different operative positions of the projections of two of the combs in operatively shifted positions.

FIG. 6 is a fragmentary section of FIG. 2 taken substantially along line 6—6.

FIG. 7 is a disassembled arrangement, in elevation, of the three locking combs of this apparatus, shown in mutual operative relation.

FIG. 8 is a disassembled arrangement, in elevation, of the three cam plates of this invention shown in mutual operative relation.

FIG. 9 is a perspective view of a needle finger and a needle therein as employed in the apparatus of this invention.

FIG. 10 is a fragmentary plan view of two needle finger assemblies in operative relation to two coactively positioned thread holders and the fabric being embroidered in the machine of this invention.

FIG. 11 is a fragmentary transverse section of the machine of this invention shown looking in the direction of arrows 11—11 of FIG. 10, the dot-dash lines showing the position of a thread section upon an operative lowering of the fabric being embroidered, the thread holding member being shown in its operatively raised position.

FIG. 12 is a view substantially like FIG. 11, but showing the thread holder in its operatively lowered and thread-holding position.

FIG. 13 is a fragmentary section of FIG. 2 taken along line 13—13.

FIGS. 14 to 17, inclusive, are fragmentary elevations of three holding members and associated parts, illustrating a sequence of certain of said members in different positions.

FIGS. 18 and 19 are semi-schematic views of the bellcrank, roller, camshaft and associated parts, looking in the direction of FIG. 2, illustrating two different positions of the camshaft and showing two different plate cams in operative position, the bellcrank in these views being in operatively raised position.

FIG. 20 is a view substantially like FIGS. 18 and 19, but showing the bellcrank and associated parts in an operatively lowered or resetting position.

FIGS. 21 to 23, inclusive, are semi-diagrammatic elevational representations of a roller member and a fragment of a coacting plate cam. showing a sequence of positions of the roller for effecting an upward movement of the associated thread holder (not shown).

In the form of my invention illustrated, there are a plurality of needles, generally designated 20, adapted to employ differently colored threads, such as the threads hereinafter designated by the letters R, G, Y and B indicating the colors red, green, yellow and blue, respectively, the needles for said threads being designated 20r, 20g, 20y and 20b, respectively. The needles are operatively actuated into projected and retracted positions for performing conventional embroidering operations in a manner known to those skilled in the art. As will be noted from FIGURES 1 and 2 the needles 20r, shown in full lines in their retracted positions, are operatively moved forwardly through the fabric 21, supported by known means in a predetermined vertical work plane, and through the holes 22 in the plate 23 to their projected positions shown in dot-dash lines in said figures. and thereafter operatively withdrawn to their respective retracted positions, looped portions of the threads 20r having during this operation engaged the threads from the bobbins (not shown) in shuttles 25 to form lock stitches within the fabric 21 in known manner. By jacquard or other suitable and known automatic pattern producing means, the entire sheet of fabric 21 is moved within said work plane through various predetermined paths so as to enable the embroidering threads to form the predetermined patterns, the fabric-actuating means not being illustrated since such means are known to those skilled in the art, a detailed description thereof not being necessary for an understanding of this invention. Suffice it to say, for the purpose of this specification, that the connecting thread sections from the needles to the fabric, such as sections $R_1$, necessarily follow the movements of the fabric 21. Thus, in FIG. 2, the connecting thread section $R_1$ in one operating position is substantially horizontally disposed, whereas in another position where it is represented by dot-dash lines and designated $R_2$ it extends downwardly in an inclined direction, this occurring when the fabric 21 has been operatively moved downwardly in the general direction of the arrow A.

Among the novel aspects of this invention are the holding means, to be hereinbelow described, comprising a device for holding the said connecting thread sections so as to enable them, when operatively moved into non-operative positions, to be conveniently, rapidly and cleanly cut, permitting the selected needles carrying the threads that are next to be operated to perform their embroidering operations, and enabling the retracted non-operating needles to support their respective threads in position for subsequent embroidering operations. The said holding means are of special utility for embroidering machines provided with apparatus for changing color work like that described in the said application Ser. No. 295,700.

In the particular apparatus illustrated herein for changing color work, the said needles 20 are each secured to a needle finger 26 by a clamp 27 and screw 28 (FIGS. 9 to 12), the particular form of needle finger illustrated having a body of triangular cross-section and having on the undersides thereof the transversely extending rear notch 29 and the set of three forwardly positioned transverse notches 30, 31 and 32, notch 29 being adapted to receive therein certain needle-finger drivers and the said three notches being adapted to receive therein certain needle-finger locking elements to be hereinafter referred to. The said needle fingers 26 are slidably disposed in the V-shaped slots 33 in the finger-holder plate 34, extending longitudinally of the machine and supported by the movable bed 35 fixedly secured to the slide block 36. Extending through and in fixed relation to said slide block 36 are the two rods 37 and 38 joined by the cross-piece 39 (FIGS. 1, 2) attached to the link 40 which is movable, by means not shown, in the direction of the arrows B into one of several positions, thereby to correspondingly shift the bed 35 and the needles 20 carried thereby to the selected positions for performing embroidering operations, substantially in the manner described in said prior application, Ser. No. 295,700, as will more clearly hereinafter appear.

The means for operatively moving selected needles 20 into their respective projected and retracted positions for performing embroidering operations comprise a plurality of pivotally mounted driving members 41, there being one such member for each of said needle fingers 26, said driving members 41 being movable between operative or driving positions and inoperative or retracted positions. In its driving position, each driving member 41 has its tip 42 disposed within the said rear notch 29 of the corresponding finger, and in its retracted position said tip is out of engagement with said notch. Thus, by referring to FIGURES 2 and 4, it will be seen that all the driver members 41a have their respective tips 42a disposed within the coacting notched portions 29 of the adjacent needle fingers 26a. All the other driving members, such as driving members 41b, are so positioned that their respective tips, such as tips 42b, are out of engagement with the respective corresponding notched portions 29 of the adjacent needle fingers 26b.

To move said driving members 41 to actuate selected sets of needles, a plurality of driving combs are employed, the particular embodiment illustrated having three such combs, 43, 44 and 45, these being arranged in adjacent parallel relation and adapted to be separately moved into and out of their respective operative positions. Each of said combs has a plurality of upwardly extending bifurcated projections generally designated 46, each projection comprising two spaced walls 47 in flanking engagement with the lobe 48 of the adjacent driving element 41. If it is desired to move certain of said driving members 41 from their inoperative to their operative positions, one of said combs whose projections 46 are positioned for coaction with the driving members to be moved is shifted from its inoperative to its operative position, whereby the corresponding driving members will be rotated about their pivotal supports 49 to a position where their respective tips 42 are interengaged with the notched portions 29 of the respective adjacent needle fingers 26. Referring to FIG. 4, if, for example, thed river comb 43 were to be shifted in the direction of the arrow C, the lobs 48 of the driving members 41b would be moved by the flanking walls 47 to the right, and the said driving members 41b would be rotated about pivots 49 in a counterclockwise direction to bring the respective tips 42b into the respective adjacent notched portions 29. In this interlocked position, if the driving members 41 were to be moved forwardly towards the fabric 21, only those needle-fingers 26 interengaged with said driving members 41 will be moved forwardly into their projected operative positions.

In the specific arrangement illustrated, there are three possible combination. One is for a two-color set-up, another for a four-color set-up, and the third for a six-color set-up. For a two-color set-up, the combs are so arranged as to actuate at one time alternate needle fingers; for a four-color set-up they are arranged to simultaneously actuate every fourth finger, such as the 1st, 5th, 9th, 13th etc.; and for a six-color set-up they are arranged to simultaneously actuate every sixth finger, such as the 1st, 7th, 13th etc. In the position of the combs shown in FIG. 4 there is a four-color set-up, the combs being so positioned as to be in interengagement with all the driving members designated 41a. It should be noted that certain of the drivers designated S have pins 50 therein, whereby these are always interengaged with their corresponding needle fingers. Comb 44 has been shifted so that its respective pairs of walls 47a have operatively rotated the coacting driving members 41a to the illustrated driving positions, whereby every fourth needle finger is interengaged with a driving member—said interengaged fingers being those desognated 26a. Similarly, by shifting each of the other combs 43 and 45 the other two color set-ups can be effected.

The reciprocating supporting structure for the said driving combs and driving members includes the wall 51 carrying the pivot studs 49 pivotally supporting said driving members 41, said wall 51 being supported by the base 52 which slidably supports said combs 43, 44 and 45, said base 52 being operatively connected to the upright wall 53 reciprocatingly movable in the direction of the arrows E (FIG. 2) by means not shown but known to those skilled in the art, such reciprocating actuating means being like those shown in said application, Ser. No. 295,700.

In addition to said driving means for reciprocatingly actuating said needle fingers 26, there are needle finger holding means comprising one stationary comb 54 and two movable combs 55 and 56 (see FIGURES 2 and 5). These combs have upwardly extending projections designated 57, 59 and 61, these being adapted to interengage the respective notches 30, 31 and 32 of the said needle fingers 26 when they are in certain positions, thereby locking such fingers against movement. Upon the operative shifting of the needle bed, certain of the fingers 26 are brought into alignment with one or more of said projections. and certain other of said fingers are brought into alignment with coactively associated recesses generally designated 58, the arrangement being such that there are no obstructing projections 57 to prevent the operative reciprocal movements of said needle fingers and their embroidery needles. The positioning of the movable locking combs 55 and 56 in relation to said stationary locking comb 54, and the relative coactive positioning of these locking or holding combs and said driving combs 43, 44 and 45 enable only selected sets of needles, carrying selected colors, to perform their embroidering operations.

By referring to FIG. 5 showing the relative positions of said stationary and movable locking combs, it can be seen how the above-referred-to three color set-ups can be effected. The full-line positions are for a four-color set-up whereby the needle fingers that are in line with every fourth recess 58 will be positioned in unobstructed paths. In the stationary locking comb 54, the total number of projections 57 and spaces 58 corresponds to the total number of needle fingers. It will be noted that projections 59 of comb 55 are in intercepting relation to recesses 58a of comb 54, and that projections 61 of comb 56 are in alignment with certain of projections 57 of comb 54 but not in intercepting relation to any of the recesses of comb 54. The arrangement is such that the non-intercepted recsses of comb 54 are recesses 62, 63, 64, 65 etc., thereby presenting free and unobstructed paths for every four needle fingers. Hence, with the arrangement of the driving combs 43, 44 and 45 shown in FIG. 4 and the arrangement of the holding combs 54, 55 and 56 shown in FIG. 5, the machine is set up for four-color operation. After the completion of the predetermined embroidering operation with one color through the operation of one set of needles, the needle bed is shifted, substantially in the manner described in the apparatus disclosed in said patent application Serial No. 295,700, to successively bring other color sets of needles into operative positions, the inoperative positions being held against movement by the projections 57, 59 and 61 of said locking combs.

To change to a two-color set up, the comb 55 is shifted to the left, to bring the projections to the illustrated dotted positions. And to change to a six-color set-up, the comb 55 is shifted to the left, as aforesaid, and the comb 56 is shifted to the right to bring the projections to the indicated dotted positions. The manner of shifting the combs 55 and 56 is not illustrated, since that can be effected by any known means, the particular method of shifting not being within the scope of this application.

Upon completion of the operation of one color-set of needles, it is necessary to sever all the thread sections extending from said set of needles, and permit the next selected set to begin its operations. In a multi-color apparatus of the character above described it is of prime importance that this be done expeditionaly. The thread-holding device constituting an important aspect of this invention is adapted to permit such color-change operations to be performed in the desired expeditious manner, and to enable the holding operations to be readily effected for two-color, four-color or any other color set-up of the machine, as will appear from the following description.

By referring to FIG. 11 it will be noted that in the operating position illustrated the thread section (red) is that indicated by $R_1$. After the last stitch the fabric is operatively moved downwardly in the direction of the arrow F, bringing the connecting thread down to the dot-dash position $R_2$. Laterally adjacent said thread section is a thread holder 66 comprising a vertical stem 67 at the top of which is a horizontally extending lip 68, said stem extending vertically through and being in slidable engagement with the bar 69 which extends longitudinally of the machine and slidably supports a plurality of similar thread holders 66 for all of the needles on the machine. When the bed of the machine is laterally shifted, in the manner aforesaid and substantially as described in said prior patent application, the entire bar 69 and all the said thread holders are correspondingly shifted. Such shifting operations, shown to be in the direction of arrow H (FIG. 14) bring said lip 68 into overlying engagement with the thread section $R_2$, as illustrated in FIG. 15. Thereafter, by a mechanism to be hereinbelow described, the holder 66 is brought down to the position shown in FIGS. 12, 16, the said lip 68 clamping the thread section $R_2$ against the top of the said bar 69. The lip 68 and bar 69 thus serve as coactive clamping members, the bar serving as an anvil to receive the adjacent thread section. This clamping action takes place for all the thread sections $R_2$ carried by the needles of the color set corresponding to that of needle 20r. Then, with all the thread sections $R_2$ operatively clamped down, these threads, along the entire length of the machine, are severed, this operation being readily, cleanly and efficiently done first because there are no other thread sections in the way, and secondly because all the thread sections $R_2$ are firmly clamped in place at a single convenient level, all thread sections being disposed in parallel inclinations. FIGS. 14, 15 and 16 show previously severed thread sections $G_2$ and $Y_2$, and FIG. 17 shows thread section $R_2$ now in severed condition, the latter figure also showing thread holder 66a for the green thread G operatively raised into a non-holding position, the thread section G₂ having been released and ready for the ensuing embroidering operations.

By referring to FIGURES 2, 6 and 13 it will be seen that each of the thread holders 66 is pivotally attached to a connecting link 70 which in turn is pivotally connected to the arm 71 of the bellcrank 72 mounted over and affixed to the cam follower shaft 73, the other arm 74 of said bellcrank having a roller 75 thereon for engagement with an operatively positioned cam to be hereinafter described (see also FIGURES 18 to 23). Adjacent each of said bellcranks is a collar 76 affixed to said shaft 73, there being between each of said collars and the next bellcrank spaced therefrom a coil spring 77 mounted over said shaft 73, one terminal 78 of said spring resting upon the wall 79 (FIG. 2), the other terminal 80 being hooked over the bellcrank arm 71 and yieldably urging it downwardly. The arrangement is hence such that, when the rollers 75 are not engaged by a cam, as in FIG. 20, the arms 71 and 74 are in their lowered position (due to the downward pressure of the said spring 77), and the corresponding thread holders 66 are in their respective lowered or thread-holding positions, to wit, the positions of the lowered holders 66 illustrated in FIGURES 2, 6, 12, and 13. Note that the respective lips 68 limit the downward movement of said holders. It is only when, upon an operative shifting of the machine bed and the consequent shifting of said bar 69 and the holders 66 in the manner aforesaid, that certain of said thread holders will, in their shifted positions, be actuated upwardly through the engagement of the corresponding rollers 75 with an operatively selected cam member, in the manner described below.

In the specific embodiment of this invention illustrated, there are three such cam members, to wit, cam members 81, 82 and 83, these being flat cam plates with spaced cam lobes, generally designated 84, affixed to the respective faces 85, 86 and 87 of the cam shaft 88, shown as of polygonal cross-section. The said cam lobes are proportioned so that, during the aforesaid shifting of the needle bed and the consequent shifting of the shaft 73 and bellcranks 72 carried thereby, the rollers 75 (carried by the bellcranks) will be brought into engagement with the cam edges 89 of the coactively positioned cams 84 and urged upwardly. FIGURES 21 to 23 illustrate three positions of a roller 75 progressing upwardly from its low position at the base of the lobe 84 shown in FIG. 21, to an intermediate position shown in FIG. 22 and then to its uppermost position of FIG. 23. Such upward movement of the roller 75 will cause the corresponding bellcrank arm 74 to move upwardly, whereby the bellcrank 72 will be rotatably actuated in a clockwise direction, as indicated by the arrow J of FIG. 2 and schematically shown in FIG. 18. When the roller 75 is in its said uppermost position, the cam lobe 84 upon which it rests thus serves to maintain the bellcrank, and hence the corresponding thread holder 66, in its upper operative position. There it remains until an operative shifting of the bed removes the roller 75 from the supporting cam lobe, whereupon the corresponding spring 77 operatively urges the bellcrank down to its lowermost or resetting position illustrated in FIG. 20, the roller 75 being shown out of contact with the adjacent cam. The consequent lowered positions of the holder and associated parts are illustrated by the dot-dash lines of FIG. 2. FIGURES 6 and 13 also show the lowered, as well as the operatively raised (66b), positions of a number of holder members.

The lobes of said respective cam plates are spaced to correspond to the spacing of the thread holders in the respective sets for the aforesaid two-color, four-color and six-color set-ups. For example, the cam plate 81 is designed for the above-described four-color set-up, said plate having a set of lobes spaced to operatively lift, in the manner aforesaid, the thread holders 66b (FIG. 10) and successively spaced holders of the set which are positioned to engage the threads spaced four needles apart, such as the threads R of the said needles 20r. Similarly cam plate 82 has its lobes 84b spaced for said two-color set-up, and plate 83 has its lobes 84c spaced for said six-color set-up.

The said cam shaft 88, in the form illustrated, is manually rotatable into its various selected positions, the crank handle 90 connected to said cam shaft, serving to effect such selective rotation. By such rotation of the cam shaft 88, a selected cam plate can be placed in operative position. FIG. 18 shows cam plate 81 in operative position, and FIG. 19 shows cam plate 82 in operative position. In the embodiment illustrated, it is after the selective rotation of said cam shaft 88 that the needle bed 35 is operatively shifted to the selected position for operative positioning of a selected color-set of needles. It is also within the contemplation of this invention to effect a substantially simultaneous shifting of the needle bed and operative rotation of the cam shaft.

The apparatus above described is thus adapted not only to effect rapid and convenient thread-color changes but also to permit the necessary related operations of severing from the work threads of one color that have completed a predetermined operation, holding the inoperative threads in non-interfering positions, and enabling the threads of the next selected color to be operatively positioned, the color-change and thread holding and releasing operations all being performed by relatively simple means.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. In an embroidering apparatus, of the class in which there are a plurality of sets of thread-carrying needles reciprocatingly movable between retracted and projected positions, a sheet of fabric positioned in operative embroidering relation to said needles, and thread sections extending between said fabric and the needles when the latter are in their respective retracted positions, the combination of shifting means for moving said needles laterally to and from predetermined selected operative embroidering positions, means for reciprocatingly actuating operatively positioned needles to perform stitching operations, separate thread holding means in coactive relation with said respective sets of needles, the thread-holding means for each of said sets comprising a plurality of thread-engaging members corresponding in number to the number of needles in the set and in adjacent relation to the respective thread sections thereof, said members being movable between operative and inoperative limiting positions, said members when in their said operative positions having portions thereof in engagement with the corresponding thread sections and when in their said inoperative limiting positions having said portions out of engagement therewith, anvil means in coactive relation with said respective members and positioned for supporting engagement with the thread sections operatively engaged by said members when disposed in their respective operative limiting positions, means for shifting said holding means laterally coactively with said needle shifting means, and simultaneous actuating means for simultaneously moving all the thread-engaging members of a selected set between their said limiting positions, said anvil means being positioned below said respective thread-engaging members, said simultaneous actuating means comprising a set of movable elements for each of said sets of thread-holding means, said elements being operatively connected to all the thread-engaging members of the corresponding set of thread-holding means, and selective means for simultaneously actuating the said movable elements of a selected set of said elements between predetermined limiting positions thereby to simultaneously move said coactive thread-engaging members between their respective limiting positions, said movable elements comprising a plurality of bellcranks corresponding in number to said thread-engaging members, a shaft supporting said bellcranks, each of said bellcranks having two arms, one arm being connected to the corresponding thread-engaging member and the other arm having a cam follower thereon, and cam means for simultaneously engaging the cam followers of the bellcranks operatively connected to the thread-engaging members of a selected set.

2. In an embroidering apparatus, the combination according to claim 1, said cam means comprising a cam shaft and a plurality of parallel longitudinal plate cams thereon, said respective cams having thereon cam lobes spaced to engage cam followers of the bellcranks corresponding to selected sets of said thread-engaging members, said lobes and said respective bellcrank arms being so proportioned and positioned as operatively to cause an elevation of the coactive thread-engaging members upon an operative engagement of said respective lobes and cam followers, and spring means urging said respective thread-engaging members downwardly, said cam shaft being rotatable for bringing a selected plate cam thereon into operative relation to said bellcranks.

References Cited

UNITED STATES PATENTS

| | | | |
|---|---|---|---|
| 1,080,915 | 12/1913 | Keller | 112—83 |
| 1,086,470 | 2/1914 | Schoenfeld | 112—83 |
| 1,094,896 | 4/1914 | Hill | 112—252 |
| 3,177,834 | 4/1965 | Urscheler | 112—83 |

FOREIGN PATENTS

| | | |
|---|---|---|
| 25,857 | 2/1902 | Switzerland. |

JORDAN FRANKLIN, *Primary Examiner.*

A. R. GUEST, *Assistant Examiner.*